Oct. 10, 1944.  L. F. BEACH ET AL  2,360,191

DIRECTIONAL GYROSCOPE

Original Filed Feb. 20, 1942

INVENTORS
L. F. BEACH
O. E. ESVAL
BY A. W. LANE
Herbert J. Thompson
their ATTORNEY.

Patented Oct. 10, 1944

2,360,191

UNITED STATES PATENT OFFICE 2,360,191

DIRECTIONAL GYROSCOPE

Lennox F. Beach, Merrick, Orland E. Esval, Huntington, and Arthur W. Lane, Freeport, N. Y., assignors to Sperry Gyroscope Company, Inc., Brooklyn, N. Y., a corporation of New York Original application February 20, 1942, Serial No. 431,704. Divided and this application September 12, 1942, Serial No. 458,120

3 Claims. (Cl. 173—324)

This invention generally relates to the journal pivot structure of gyroscopes and particularly is directed to the novel subject matter in this connection divided from our copending application Serial No. 431,704, filed February 20, 1942, for Directional gyroscopes.

Figure 1:
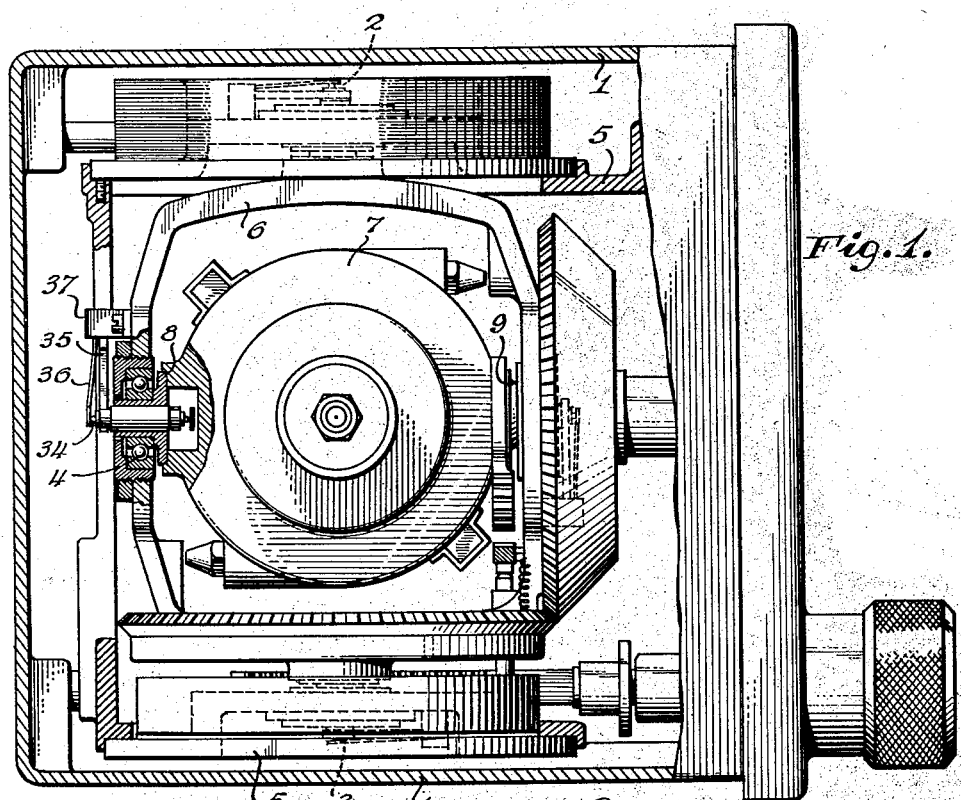

The novel features and details of the invention will be apparent from the following description when read in relation with the accompanying drawing, wherein Fig. 1 is a vertical section of a directional gyroscope in which the journal pivot structure of the present invention has been embodied.

Figure 2:
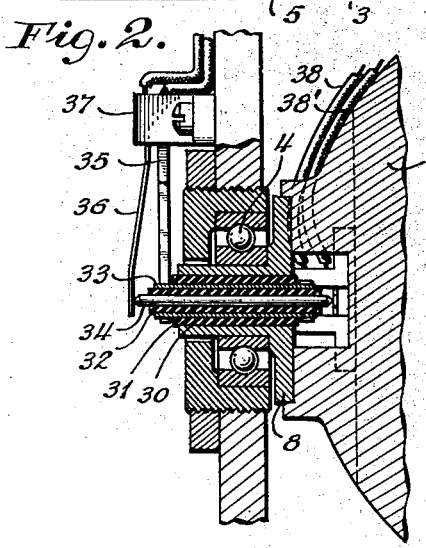
Figure 3:
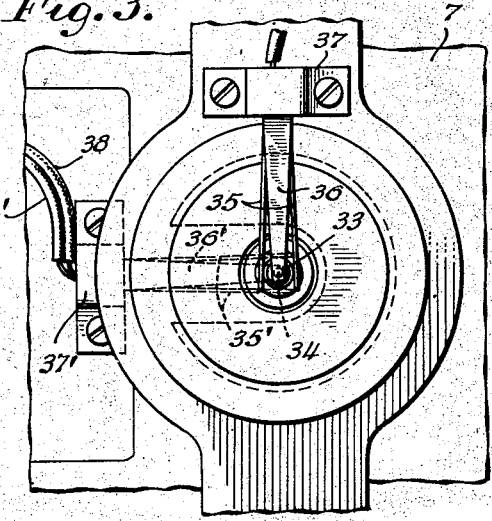

Figure 2 is an enlarged detail section view of one of the improved trunnion supports of the gyro instrument, and Fig. 3 is a side elevation of the trunnion support illustrated in Fig. 2.

The instrument in which this invention is illustratively embodied as shown in the drawing is an electrically spun directional gyroscope of the type which may or may not be slaved to or controlled from a remote magnetic compass. The gyroscopic instrument is shown enclosed within an outer casing 1, the instrument being mounted for rotation about a vertical axis on trunnions 2, 3, journalled in suitable anti-friction ball bearings located in an inner frame 5 mounted within the outer casing 1. A conventional vertical ring 6 includes the axis defining trunnions 2, 3, and furthermore supports the rotor bearing frame or case 7 of the gyroscope with freedom about a horizontal axis by means of trunnions 8, 9, which extend from opposite sides of the case 7 and are journalled in suitable bearings 4 mounted in the ring. The gyro rotor (not shown) is journalled within the rotor bearing case in such a manner that the spin axis thereof is normally disposed at right angles to both the vertical axis of the ring 6 and the horizontal axis of the bearing case 7. The gyro rotor is electrically spun by means of a suitable form of polyphase motor (not shown) which is also situated within the case 7.

Electrical energy is provided to energize the motor by which the gyro rotor is spun by way of a number of current conducting substantially frictionless trunnion pivot structures constructed in accordance with the present invention. To avoid repetition only one of the trunnion structures will be described in detail. Both of the vertical trunnions of the ring 6 and the trunnions for the case 7 may be constructed in accordance with the teaching of the present invention if desired. One of the trunnions by which the case 7 is pivotally mounted on the ring 6 and which embodies the present inventive concepts is shown to include an axial bore which extends through the same. This central cylindrical bore in the trunnion 8 is indicated at 30. One or more insulating sleeves are placed within the bore 30. Two of such sleeves are employed in the present instance as indicated at 31 and 32, the same being concentrically arranged with respect to each other and in relation to the axial bore 30. Between the sleeves 31 and 32 is a current conducting sleeve 33 and through the hole in the inner sleeve 32 extends a conducting pin 34. Contacting with an outwardly extending portion of sleeve 33 is a conducting arm 35 in the form of a small hairpin spring which carries one current lead and is fixedly mounted in the stationary portion of the pivot structure in block 37 which in this instance is situated on the ring 16. In the particular construction illustrated, sleeve 33 is longer than the axial dimension of the trunnion and consequently provides an area at opposite sides of the trunnion at which an electrical contact of this character can be made. The sleeve 33 may extend outwardly from one side of the trunnion only, however, and a conducting lead or other means of this character connected to sleeve at the other side of the trunnion.

A second current lead is carried by a light spring finger 36 clamped at one end in the fixed block 37 and having its free end yieldably engaging one of the pointed ends of the pin 34. The pin 34 being longer than the conducting sleeve 33 also extends outwardly beyond at least one end of the trunnion to receive the conducting finger or arm 36. A similar three-fingered contact arrangement may be employed at the inwardly disposed portion of the trunnion, the parts of which are fixed to block 37', Fig. 3, and are indicated at 35' and 36'. Energy is supplied the gyro rotor spinning motor by way of leads 38 and 38' which are respectively connected to the ends of the conducting fingers 35' and 36' at the block 37'. This trunnion construction may be employed in both the pivot structures for the vertical ring 6 and the rotor bearing case 7, thus supplying a total of four current leads to the motor. Because of the point contact between pin 34 and conducting arms 36 and 36', and because of the very light engagement of the U-shaped spring conductor 35 and 35' with the sleeve 33 and the relatively small diameter of the sleeve, friction about the respective trunnion axes is kept at a minimum. Obviously any number of sleeves may be employed with the single conducting pin arranged in the improved trunnion pivot structure without departing from the concepts of the disclosed invention.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A current conducting substantially frictionless trunnion pivot structure for gyroscopic instruments comprising a trunnion having an axially extending bore therethrough, an insulating sleeve fitting said bore, a conducting sleeve fitting said insulating sleeve and of sufficient length to extend outwardly from the respective ends of the trunnion, a second insulating sleeve fitting said conducting sleeve, an axially situated conducting pin fitting said second insulating sleeve and extending outwardly from the respective ends of the trunnion, said pin being longer than the conducting sleeve, resilient conducting arms mounted on the respective trunnion connected parts for contacting the respective outwardly extending portions of the conducting sleeve, and further similarly mounted conducting arms for contacting the respective outwardly extending portions of the pin.

2. A current conducting substantially frictionless trunnion pivot structure for gyroscopic instruments comprising a trunnion having an axially extending bore therethrough, an insulating sleeve fitting said bore, a conducting sleeve fitting said insulating sleeve and extending outwardly from the respective ends of the trunnion, a second insulating sleeve fitting said conducting sleeve, an axially situated pointed end conducting pin fitting said second insulating sleeve and extending outwardly from the respective ends of the trunnion, said pin being longer than the conducting sleeve, a U-shaped conductor fixedly mounted on the respective trunnion connected parts having resilient arms contacting the respective outwardly extending portions of the conducting sleeve, and similarly mounted resilient arm conductors contacting the respective pointed ends of the conducting pin.

3. A current conducting substantially frictionless trunnion pivot structure for gyroscopic instruments comprising a trunnion having an axially extending bore therethrough, an insulating sleeve fitting said bore, a conducting sleeve fitting said insulating sleeve extending outwardly from one of the respective ends of the trunnion, a second insulating sleeve fitting said conducting sleeve, an axially situated conducting pin fitting said second insulating sleeve and extending outwardly from the trunnion to a greater extent than the conducting sleeve, a separate conducting arm fixedly mounted on the stationary portion of the pivot structure containing the respective extending ends of the conducting sleeve and pin, and separate conducting means connected to the respective opposite ends of said conducting sleeve and pin.

LENNOX F. BEACH.
ORLAND E. ESVAL.
ARTHUR W. LANE.

CERTIFICATE OF CORRECTION.

Patent No. 2,360,191.　　　　　　　　　　　　　　　　October 10, 1944.

LENNOX F. BEACH, ET AL.

It is hereby certified that error appears in the printed specification of the above numbered patent requiring correction as follows: Page 2, second column, line 29, claim 3, for the word "containing" read --contacting--; and that the said Letters Patent should be read with this correction therein that the same may conform to the record of the case in the Patent Office.

Signed and sealed this 2nd day of January, A. D. 1945.

(Seal)

Leslie Frazer
Acting Commissioner of Patents.